US012729867B2

(12) United States Patent
Li et al.

(10) Patent No.: US 12,729,867 B2
(45) Date of Patent: Sep. 8, 2026

(54) AIR PURIFIER

(71) Applicant: Shenzhen Chenbei Technology Co., Ltd., Shenzhen (CN)

(72) Inventors: Zongquan Li, Shenzhen (CN); Zhenhua Zheng, Shenzhen (CN)

(73) Assignee: Shenzhen Chenbei Technology Co., Ltd., Shenzhen (CN)

( * ) Notice: Subject to any disclaimer, the term of this patent is extended or adjusted under 35 U.S.C. 154(b) by 570 days.

(21) Appl. No.: 17/819,318

(22) Filed: Aug. 12, 2022

(65) Prior Publication Data

US 2023/0051844 A1 Feb. 16, 2023

(30) Foreign Application Priority Data

Aug. 12, 2021 (CN) ........................ 202110925640.3

(51) Int. Cl.
*F24F 8/80* (2021.01)
*B01D 46/00* (2022.01)
(Continued)

(52) U.S. Cl.
CPC ............ *F24F 8/80* (2021.01); *B01D 46/0004* (2013.01); *B01D 46/0005* (2013.01);
(Continued)

(58) Field of Classification Search
CPC .. F24F 13/28; F24F 8/108; F24F 13/20; F24F 11/89; F24F 11/72; B01D 46/0004;
(Continued)

(56) References Cited

U.S. PATENT DOCUMENTS 4,583,680 A * 4/1986 Gordon .................... B65D 1/34 229/5.5
5,035,797 A * 7/1991 Janik ...................... B01D 35/30 210/450
(Continued)

FOREIGN PATENT DOCUMENTS

CN 212492057 U * 2/2021
CN 112944557 A * 6/2021 ............ F24F 13/028
(Continued)

OTHER PUBLICATIONS

CN212492057U_ENG (Espacenet machine translation of Chang) (Year: 2021).*
(Continued)

*Primary Examiner* — Gabriel E Gitman
(74) *Attorney, Agent, or Firm* — Trojan Law Offices, P.C.

(57) ABSTRACT

An air purifier, including: a first body including a first housing; and a second body detachably connected to the first body and including a second housing, where buckles are arranged on the first housing, and snap-fit members are arranged on the second housing; the number of the buckles is greater than the number of the snap-fit members; and the first body in butt joint is enabled to rotate relative to the second body, so that the buckles can be hooked with the snap-fit members or separated from the snap-fit members. In the air purifier, a larger number of buckles are hooked with a smaller number of snap-fit members, so that disassembly and assembly operations can be simplified. Because the first body and the second body are detachable, the second body can be operated independently when the filter screen is detached.

13 Claims, 12 Drawing Sheets

(51) Int. Cl.

| | |
|---|---|
| ***B01D 46/24*** | (2006.01) |
| ***F24F 8/108*** | (2021.01) |
| ***F24F 13/20*** | (2006.01) |
| ***F24F 13/28*** | (2006.01) |
| *F02M 35/024* | (2006.01) |

(52) U.S. Cl.
CPC .............. *B01D 46/24* (2013.01); *F24F 8/108* (2021.01); *F24F 13/20* (2013.01); *F24F 13/28* (2013.01); *B01D 2201/305* (2013.01); *B01D 2201/4007* (2013.01); *B01D 2201/4015* (2013.01); *B01D 2201/4046* (2013.01); *B01D 2201/4076* (2013.01); *B01D 2265/026* (2013.01); *B01D 2265/028* (2013.01); *B01D 2265/06* (2013.01); *B01D 2271/022* (2013.01); *B01D 2271/027* (2013.01); *F02M 35/02416* (2013.01)

(58) Field of Classification Search
CPC B01D 46/005; B01D 46/24; B01D 2265/026; B01D 2265/028; B01D 2265/06; B01D 2271/022; B01D 2271/027; B01D 46/645; B01D 2273/30; B01D 2279/50; B01D 46/2411; B01D 2201/305; B01D 2201/40; B01D 2201/407; B01D 2201/4007; B01D 2201/4015; B01D 2201/4046; B01D 2201/4053; B01D 2201/4061; B01D 2201/4076; B01D 2201/4048; F02M 35/02416; A61L 2209/14
See application file for complete search history.

(56) References Cited

U.S. PATENT DOCUMENTS

2019/0299143 A1* 10/2019 Decoster ............ F02M 35/0214
2020/0188827 A1* 6/2020 Yang .................. B01D 53/0415

FOREIGN PATENT DOCUMENTS

WO WO-2016072774 A1 * 5/2016 ............. A61L 9/014
WO WO-2021145528 A1 * 7/2021 ............. F04D 25/08

OTHER PUBLICATIONS

CN112944557A_ENG (Espacenet machine translation of Lin) (Year: 2021).*

* cited by examiner

AIR PURIFIER

REFERENCE TO RELATED APPLICATION

This is a non-provisional application which claims priority to a Chinese patent application having an application number of CN202110925640.3, and a filing date of Aug. 12, 2021, the entire contents of which is hereby incorporated by reference.

TECHNICAL FIELD

The present invention relates to the technical field of purification devices, and in particular, to an air purifier.

BACKGROUND

At present, existing air purifiers in the market usually have an integrated structure, that is, a housing (or a cabin) for accommodating a filter screen and a housing for accommodating a fan and an electronic device are an identical housing, and an opening for the filter screen to enter and exit the housing is arranged at the bottom of the entire housing. When the filter screen needs to be taken out of the housing for cleaning or replacement, the air purifier needs to be inverted, so that the filter screen is located above, the fan, the electronic device, and the like are located below the filter screen to facilitate disassembly and assembly of the filter screen. However, this disassembly and assembly method, on one hand, makes the operation process complicated and inconvenient, and on the other hand, makes dust on the filter screen fall on the fan and the electronic device during disassembly and assembly. As a result, the service life of the electronic device is shortened, and the dust falling on the fan and the electronic device is blown to a user during restart, affecting a purification effect.

In addition, impurities and dust are also attached to the housing for accommodating the filter screen. However, because this housing and the housing for accommodating the electronic device are the identical housing, it is inconvenient to clean the housing (there is a risk that water enters the electronic device in the cleaning process). As a result, the effect of cleaning the air purifier is not ideal.

SUMMARY

In view of the problems, the present invention provides an air purifier, which can not only make it convenient to perform disassembly and assembly operations, but also improve a purification effect and a cleaning effect.

To achieve the foregoing objective, the present invention provides the following technical solution:

An air purifier includes:

a first body including a first housing; and a second body, configured to take in air and filter the incoming air and including a second housing, where the second body is detachably connected to the first body; where buckles are arranged on the first housing, and snap-fit members are convexly arranged on an inner wall of the second housing;

a plurality of circumferentially-distributed buckles and a plurality of circumferentially-distributed snap-fit members are provided;

the number of the buckles is greater than the number of the snap-fit members, each of the snap-fit members is capable of being connected to one buckle, and all the snap-fit members are connected to the buckles; and The first body in butt joint is enabled to rotate relative to the second body, so that the buckles are capable of being hooked with the snap-fit members to connect the first body to the second body, and the buckles are capable of being separated from the snap-fit members to separate the first body from the second body.

Preferably, in the foregoing air purifier, the second body includes a filter screen accommodated in the second housing, a guide assembly is arranged in the second housing, and the guide assembly guides the filter screen entering the second housing to move the filter screen to an installation position.

Preferably, in the foregoing air purifier, the filter screen is a cylindrical filter screen, and the guide assembly includes outer guide members arranged on an outer side of the filter screen and an inner guide member arranged on an inner side of the filter screen.

Preferably, in the foregoing air purifier, the second housing is a barrel-shaped housing, the outer guide members are a plurality of strip-shaped members which are convexly arranged on a circumferential inner wall of the second housing and extend in an axial direction of the second housing, and all the strip-shaped members are distributed at intervals in a circumferential direction of the second housing and are in contact with an outer wall of the filter screen; and the inner guide member is a convex block convexly arranged on a bottom wall of the second housing, and the convex block is in contact with an inner wall of the filter screen.

Preferably, in the foregoing air purifier, protruding members are arranged at a connection opening of the first housing, and the protruding members protrude relative to the connection opening in an axial direction of the barrel-shaped first housing.

Preferably, in the foregoing air purifier, clamping grooves are arranged at a connection opening of the second housing, and the protruding members enter the clamping grooves and are clamped with the clamping grooves to achieve butt joint of the first body and the second body.

Preferably, in the foregoing air purifier, a flow guide member for guiding filtered air into the first housing is arranged at the connection opening of the first housing used for butt joint with the second housing.

Preferably, in the foregoing air purifier, the protruding members are each a convex ring connected to the connection opening of the first housing and coaxial with the connection opening, and an outer diameter of the convex ring is smaller than an outer diameter of the connection opening; the flow guide member has a horn structure, and radially protruding clamping blocks are arranged on an edge of a large opening of the horn structure, the protruding members are each provided with a clamping opening, and the clamping blocks are clamped with the clamping openings to position the flow guide member at the connection opening of the first housing.

Preferably, in the foregoing air purifier, the buckles are convexly arranged on a surface of the flow guide member that faces away from the first housing; and the snap-fit members and the outer guide members are staggered.

Preferably, in the foregoing air purifier, the surface of the flow guide member that faces away from the first housing is provided with a setting region corresponding to the filter screen, a first sealing member is arranged in the setting region, and the first sealing member abuts against a top end face of the filter screen to achieve hermetic connection between the flow guide member and the filter screen.

Preferably, in the foregoing air purifier, a protrusion is arranged on the top end face of the filter screen, and when the first sealing member abuts against the top end face, the protrusion presses the first sealing member to produce elastic deformation.

Preferably, in the foregoing air purifier, a second sealing element is arranged between a bottom end face of the filter screen and the bottom wall of the second housing, so that the filter screen is hermetically connected to the bottom wall of the second housing.

Preferably, in the foregoing air purifier, the bottom wall of the second housing is provided with an annular mounting groove for mounting the second sealing member, and the mounting groove is arranged around the inner guide member and coaxial with the inner guide member.

The air purifier provided in the present invention is set as two detachable parts, that is, a first body and a second body. The first body is a part of the air purifier that achieves electronic control and air drive, and includes a first housing; and the second body is a part of the air purifier configured to take in air and filter the incoming air, and includes a second housing and a filter screen arranged in the second housing. Buckles are arranged on the first housing, and snap-fit members are convexly arranged on second housing. When the first body is connected to the second body, the buckle can be hooked with the snap-fit members by rotating the first body and the second body in butt joint, thereby achieving a connection between the first body and the second body by using the buckles and the snap-fit members. The number of circumferentially-distributed buckles is greater than the number of circumferentially-distributed snap-fit members, so that when a larger number of buckles enter the second housing, a circumferential distance between the buckles and the snap-fit members can be reduced, and the buckles can be hooked with snap-fit members nearby only by rotating by a smaller angle. This enables a user to perform butt joint between the first body and the second body more randomly in a circumferential direction without a circumferential alignment operation during butt joint, making a butt joint angle more diversified. Compared with a threaded connection method in the prior art that requires multi-round circumferential rotations, this butt joint method can simplify the disassembly and assembly operation of the air purifier, and make the disassembly and assembly of the filter screen more convenient. In addition, because the first body and the second body are detachable, when the filter screen needs to be dismantled for cleaning, the first body and the second body may be directly separated, and the second body may be operated independently to achieve the disassembly of the filter screen. This can prevent dust from falling on an electronic control assembly and an air drive assembly, thereby preventing dust from being blown to the user, and improving the purification effect of the air purifier. In addition, in the cleaning process, because the second housing is no longer connected to the first body, the second housing can be cleaned independently, thereby improving the effect of cleaning the air purifier.

BRIEF DESCRIPTION OF DRAWINGS

To more clearly describe technical solutions in the embodiments of the present invention or in the prior art, accompanying drawings required in the description of the embodiments or the prior art are briefly described below. Obviously, the accompanying drawings in the following description illustrate only the embodiments of the present invention, and a person of ordinary skill in the art may further obtain other accompanying drawings from the provided accompanying drawings without creative efforts.

In FIG. 1 to FIG. 13:

Figure 1:
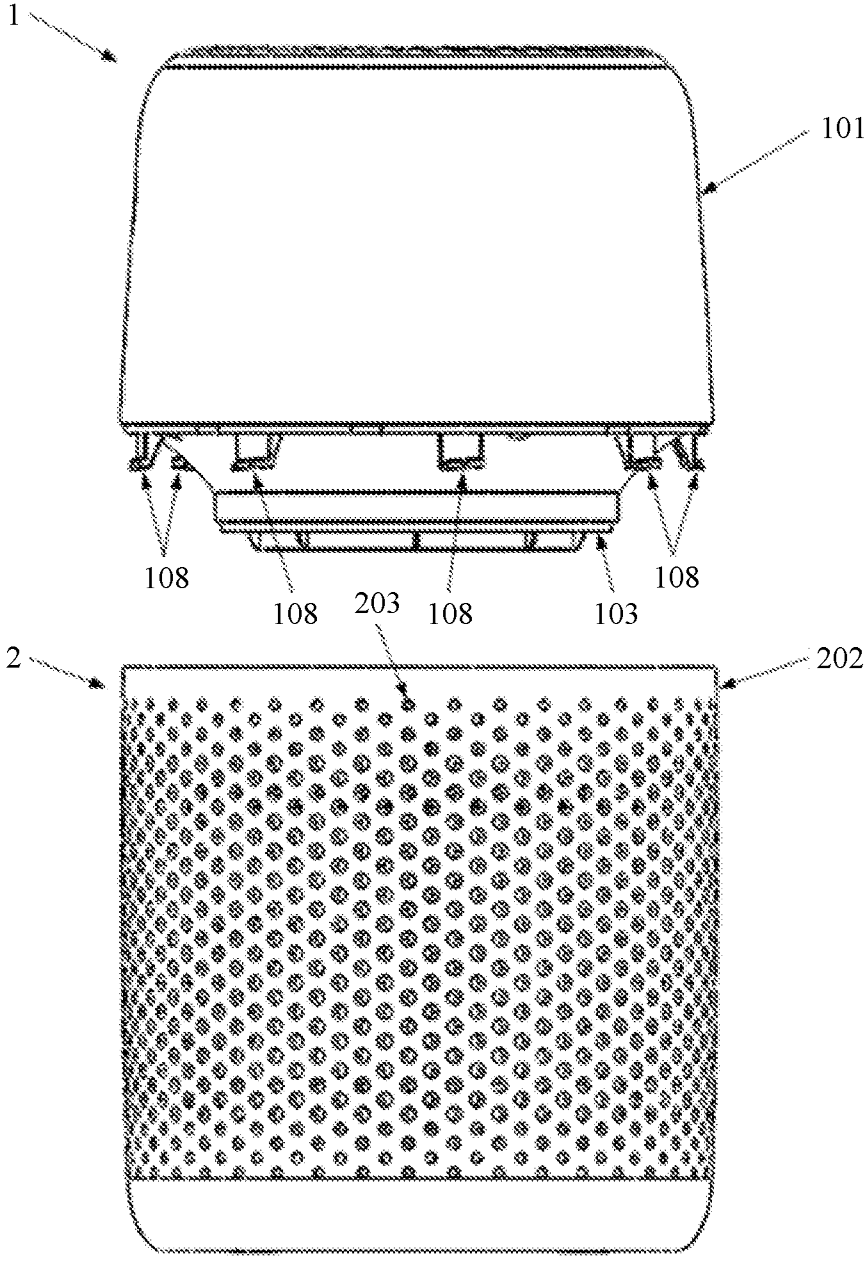
FIG. 1 is a schematic structural diagram of an air purifier provided in an embodiment of the present invention when a first body and a second body are separated.

1: first body, 2: second body;

101: first housing, 102: protruding member, 103: flow guide member, 104: clamping block, 105: clamping opening, 106: through hole, 107: connecting member, 108: buckle, 109: first sealing member;

201: filter screen, 202: second housing, 203: air inlet, 204: outer guide member, 205: arc-shaped end portion, 206: inner guide member, 207: clamping groove, 208: snap-fit member, 209: protrusion, 210: second sealing member, 211: mounting groove, 212: groove, and 213: handle.

DESCRIPTION OF EMBODIMENTS

The present invention provides an air purifier, which can not only facilitate an installation operation on a filter screen, but also improve a purification effect and a cleaning effect.

The technical solutions in the embodiments of the present invention are clearly and completely described below with reference to the accompanying drawings in the embodiments of the present invention. Clearly, the described embodiments are only some embodiments of the present invention rather than all embodiments. Based on the embodiments of the present invention, all other embodiments that are obtained by a person of ordinary skill in the art without creative efforts shall all fall within the protection scope of the present invention.

As shown in FIG. 1 to FIG. 13, an embodiment of the present application provides an air purifier. The air purifier may feature miniaturization, that is, the air purifier provided in the present application is preferably a small air purifier, so that it is convenient to place the air purifier on a desktop as a desktop air purifier, and/or the air purifier is portable as a vehicle air purifier, or the like. Certainly, this air purifier may alternatively be an air purifier with a relatively large size and placed on the ground. In the present application, the air purifier mainly includes a first body 1 and a second body 2, and the first body 1 and the second body 2 are set as a detachable connection structure, that is, the first body 1 and the second body 2 are two separable parts of the air purifier. The two parts constitute a complete air purifier through assembly, or are separated from each other through splitting. The first body 1 includes a first housing 101, and an electronic control assembly and an air drive assembly arranged in the first housing 101. The electronic control assembly is configured to control the operation of the air purifier, and includes a power supply, a mainboard, buttons, display lamps, wires and other components. The air drive assembly is an assembly that drives air from the second body 2 into the air purifier and blows air from a top end of the first body 1 to the outside of the air purifier, and includes a motor, a fan, and the like. The second body 2 is configured to make air enter the air purifier and filter the air entering the air purifier, that is, the second body 2 is an air inlet filtering part of the air purifier, and includes a filter screen 201 and a second housing 202. The detachable connection structure of the first body 1 and the second body 2 includes buckles 108 and snap-fit members 208. The buckles 108 are arranged on the first housing 101, and a plurality of buckles 108 are distributed in a circumferential direction of the first housing 101. The snap-fit members 208 are convexly arranged on an inner wall of the second housing 202, and a plurality of snap-fit members are also circumferentially distributed on the inner wall of the second housing 202. When the first body 1 and the second body 2 are in fastened connection, the first housing 101 and the second housing 202 are butted first. With the butting of the first housing 101 and the second housing 202, the buckles 108 enter an inner cavity of the second housing 202, and are kept staggered with the snap-fit members 208 in the circumferential direction of the first housing 101 or the second housing 202 (otherwise, the snap-fit members 208 will prevent the buckles 108 from entering the inner cavity of the second housing 202, affecting the butt joint of the two housings). After the first housing 101 and the second housing 202 are in butt joint, the first housing 101 or the second housing 202 is rotated (generally, the second housing 202 is rotated by operating an aforementioned handle 213), so that the two housings rotate relatively. Therefore, the staggered buckles 108 gradually approach the snap-fit members 208, and after the buckles 108 are aligned with the snap-fit members 208 to make the buckles 108 hook the snap-fit members 208, the two housings stop rotating relatively. In this case, the first housing 101 and the second housing 202 are in fastened connection with each other by using a plurality of sets of buckles 108 and snap-fit members 208 that are hooked with each other. When the first body 1 and the second body 2 need to be separated, the first housing 101 and the second housing 202 are relatively rotated in opposite directions to stagger the buckles 108 and the snap-fit members 208 again to achieve separation, so that the hooking of the first housing 101 and the second housing 202 can be removed, and therefore the two bodies can be disassembled. In addition, in the present application, each snap-fit member 208 may be connected to one buckle 108, and all the snap-fit members 208 are connected to the buckles 108, that is, when the first body 1 and the second body 2 are in a connected state, each snap-fit member 208 is hooked with one buckle 108, and no snap-fit member 208 is idle. In addition, the number of the buckles 108 is greater than the number of the snap-fit members 208, for example, eight evenly distributed buckles 108 may be provided in the circumferential direction of the first housing 101, and when the buckles are inserted in the second housing 202, each buckle 108 is located between two aforementioned adjacent outer guide members 204. Four evenly distributed snap-fit members 208 are provided in the circumferential direction of the second housing 202, and the four snap-fit members 208 are evenly distributed or unevenly distributed in the circumferential direction of the second housing 202. In the present application, the snap-fit members are preferably evenly distributed, that is, in the circumferential direction of the second housing 202, one snap-fit member 208 is provided for every two outer guide members 204.

In the air purifier with the foregoing structure, on one hand, the fastened connection between the two bodies is achieved through the hooking of the buckles 108 and the snap-fit members 208, and the number of the buckles 108 is greater than the number of the snap-fit members 208, so that when a larger number of buckles 108 enter the second housing 202, a circumferential distance between the buckles and the snap-fit members 208 can be reduced, and the buckles 108 can be hooked with snap-fit members 208 nearby only by rotating by a smaller angle. This enables the user to perform butt joint between the first housing 101 and the second housing 202 more randomly in the circumferential direction. Compared with a threaded connection method in the prior art that requires multi-round circumferential rotations, this butt joint method not only reduces an angle of rotation, but also does not require a circumferential alignment operation during butt joint, making a butt joint angle more diversified, thereby achieving the disassembly and assembly operation of the filter screen 201 more conveniently. On the other hand, the entire air purifier is set as two separated parts (that is, the first body 1 and the second body 2), so that the filter screen 201 and the second housing 202 that need to be cleaned can be separated from the first body 1, the filter screen 201 and the second body 2 are components independent relative to the first body 1, and therefore the first body 1 will not be affected when the filter screen 201 is dismantled or installed. That is, dust does not enter the first body 1 that has been separated, avoiding the occurrence of dust blowing to the user during restart. In addition, the independent second body 2 can also be cleaned, and the cleaning operation does not affect the first body 1, that is, water used for cleaning the second housing 202 does not enter the first body 1 that has been separated, thereby eliminating a risk that water enters electronic devices in the first body 1, such as a power supply, a motor, and a mainboard. In this way, both the filter screen 201 and the second housing 202 can be cleaned, so that the air purifier is cleaned more fully, and the effect of cleaning the air purifier is improved.

In the air purifier provided in the present application, the second body 2 includes a filter screen 201 and a second housing 202, and the filter screen 201 is accommodated in the second housing 202. A guide assembly is arranged in the second housing 202. In the process of installing the filter screen 201 into the second housing 202, the guide assembly can guide the filter screen entering the second housing 202 to move the filter screen 201 to an installation position at which the filter screen 201 is installed in place in the second housing 202. Specifically, the second body 2 includes a filter screen 201 and a second housing 202 for accommodating the filter screen 201. The second housing 202 is provided with air inlets 203 for allowing external air to enter, and the air inlets 203 are preferably a plurality of small holes distributed in a matrix on a side wall of the second housing 202, thereby not only improving the aesthetic appearance of the air purifier, but also ensuring that the second housing 202 has sufficient strength. The filter screen 201 is preferably a coaxial and sequentially-sleeved multilayer filter structure, and each layer of the filter structure is used to filter out different impurities in the air. In addition, in the present application, further preferably, the entire air purifier has a cylindrical structure or an approximately cylindrical structure, and the first body 1 is arranged at the top of the second body 2. That is, the first body 1 constitutes a top cylindrical section of the cylindrical structure, and the second body 2 constitutes a bottom cylindrical section of the cylindrical structure. A butt joint position of the first body and the second body is close to or located at an axial middle position of the cylindrical structure. After the first body 1 and the second body 2 are separated, the connection opening of the first body 1 for butt joint with the second body 2 is downward, while the connection opening of the second body 2 for butt joint with the first body 1 is upward, that is, the connection opening of the second housing 202 that allows the filter screen 201 to enter and exit is a top opening. When the filter screen 201 is installed into the second housing 202, the user only needs to pick up the filter screen 201 and put one end of the filter screen 201 into the connection opening of the second housing 202 from above the second housing 202. Then the filter screen 201 can fall down by using its own gravity and move to an installation position under the guidance of the guide assembly. In this way, the filter screen 201 can be moved to the installation position more accurately, conveniently and quickly, thereby further simplifying the installation operation of the filter screen 201, and facilitating disassembly and assembly and cleaning of the filter screen 201. In addition, the air purifier does not need to be inverted when disassembled or assembled, which can also facilitate operation.

In the present application, on the basis that the air purifier preferably has a cylindrical structure, as shown in FIG. 2 to FIG. 4, FIG. 7, and FIG. 8, preferably, the filter screen 201 is a cylindrical filter screen 201, and the guide assembly includes outer guide members 204 arranged on an outer side of the filter screen 201 and an inner guide member 206 arranged on an inner side of the filter screen 201. Preferably, the filter screen 201 is a cylindrical filter screen 201, which can better match the housing with the cylindrical structure. When the filter screen 201 is in the installation position, the outer guide members 204 are located on the outer side of the filter screen 201, while the inner guide member 206 is located on the inner side of the filter screen 201. When the filter screen 201 is installed into the second housing 202, a circumferential outer wall of the filter screen 201 abuts against the outer guide members 204 (when the outer guide members 204 are preferably a plurality of outer guide members evenly distributed in the circumferential direction of the aforementioned second housing 202, all the outer guide members 204 abut against the filter screen 201), the filter screen 201 falls in the extension direction of the outer guide members 204 to finally slide down to the installation position under the guidance of the outer guide members 204. In this way, external guidance of the filter screen 201 is achieved, so that the filter screen 201 can be moved to the installation position accurately, conveniently and quickly. During the movement of the filter screen 201, when the filter screen 201 is close to the installation position, due to the drop of the filter screen 201, the inner guide member 206 will enter an inner space of the filter screen 201 and be in contact with the circumferential inner wall of the filter screen 201. In this case, the filter screen 201 is guided by the outer guide members 204 and the inner guide member 206 at the same time, that is, during the falling process, the filter screen 201 is first guided externally and then guided internally and externally, so that the filter screen 201 is guided more accurately until the filter screen 201 is moved to the installation position. In addition, in the present application, further preferably, after the filter screen 201 is moved to the installation position, the circumferential outer wall of the filter screen 201 still abuts against the outer guide members 204, and the circumferential inner wall of the filter screen 201 is still in contact with the inner guide member 206 (that is, the inner guide member 206 is always in the inner space after entering the inner space of the filter screen 201 until the filter screen 201 is removed from the second housing 202), so that the outer guide members 204 and the inner guide member 206 can also limit the installed filter screen 201 in the radial direction of the second housing 202, so as to improve structural stability of the air purifier.

As shown in FIG. 1 to FIG. 4, FIG. 7, FIG. 8, FIG. 12, and FIG. 13, the second housing 202 is a barrel-shaped housing, the outer guide members 204 are a plurality of strip-shaped members which are convexly arranged on a circumferential inner wall of the second housing 202 and extend in an axial direction of the second housing 202, and all the strip-shaped members are distributed at intervals in a circumferential direction of the second housing 202 and are in contact with an outer wall of the filter screen 201; the inner guide member 206 is a convex block convexly arranged on a bottom wall of the second housing 202, and the convex block is in contact with an inner wall of the filter screen 201. In the present application, to simplify the structure, the outer guide members 204 are set as strip-shaped members (or the outer guide members 204 may be referred to as convex ribs) extending in the axial direction of the second housing 202, and a plurality of outer guide members 204 such as eight outer guide members are circumferentially distributed at intervals in the circumferential inner wall of the second body 2. When the filter screen 201 enters the second housing 202, all the convex ribs abut against the circumferential outer wall of the filter screen 201, so that the filter screen 201 can be limited and guided in the circumferential direction of the filter screen 201, and therefore the filter screen 201 can be moved to the installation position along a preset track. The installation position is a position at which the bottom end of the filter screen 201 is in contact with the bottom wall of the second housing 202. In addition, further preferably, the installation position is a central position of the bottom wall, that is, the circular convex block is coaxially arranged on the bottom wall, and when the filter screen 201 is sleeved on the convex block, the filter screen 201 and the second housing 202 are coaxially assembled. Preferably, to improve the effect of guiding and positioning the filter screen 201, preferably, a height of the convex block protruding relative to the bottom wall of the second housing 202 is 10-15 mm. In addition, the outer guide members 204 and the inner guide member 206 each may alternatively have other structures, for example, the outer guide members 204 each may be an annular member or cylindrical member coaxially arranged in the second housing 202 and having a diameter smaller than that of the second housing, while the inner guide member 206 may be an annular member or cylindrical member with a smaller diameter.

Figure 2:
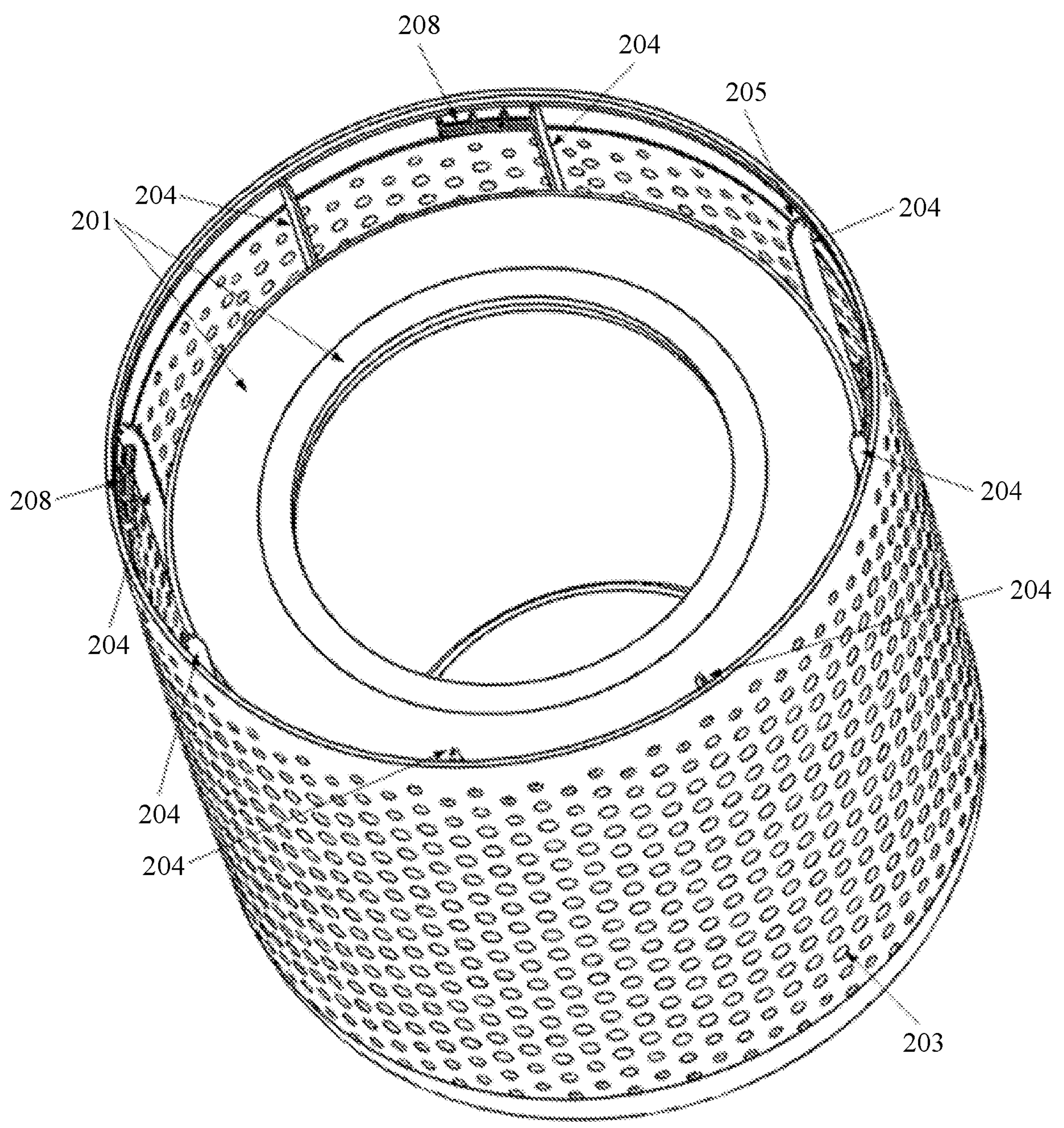
FIG. 2 is a schematic structural diagram of the second body.
Figure 3:
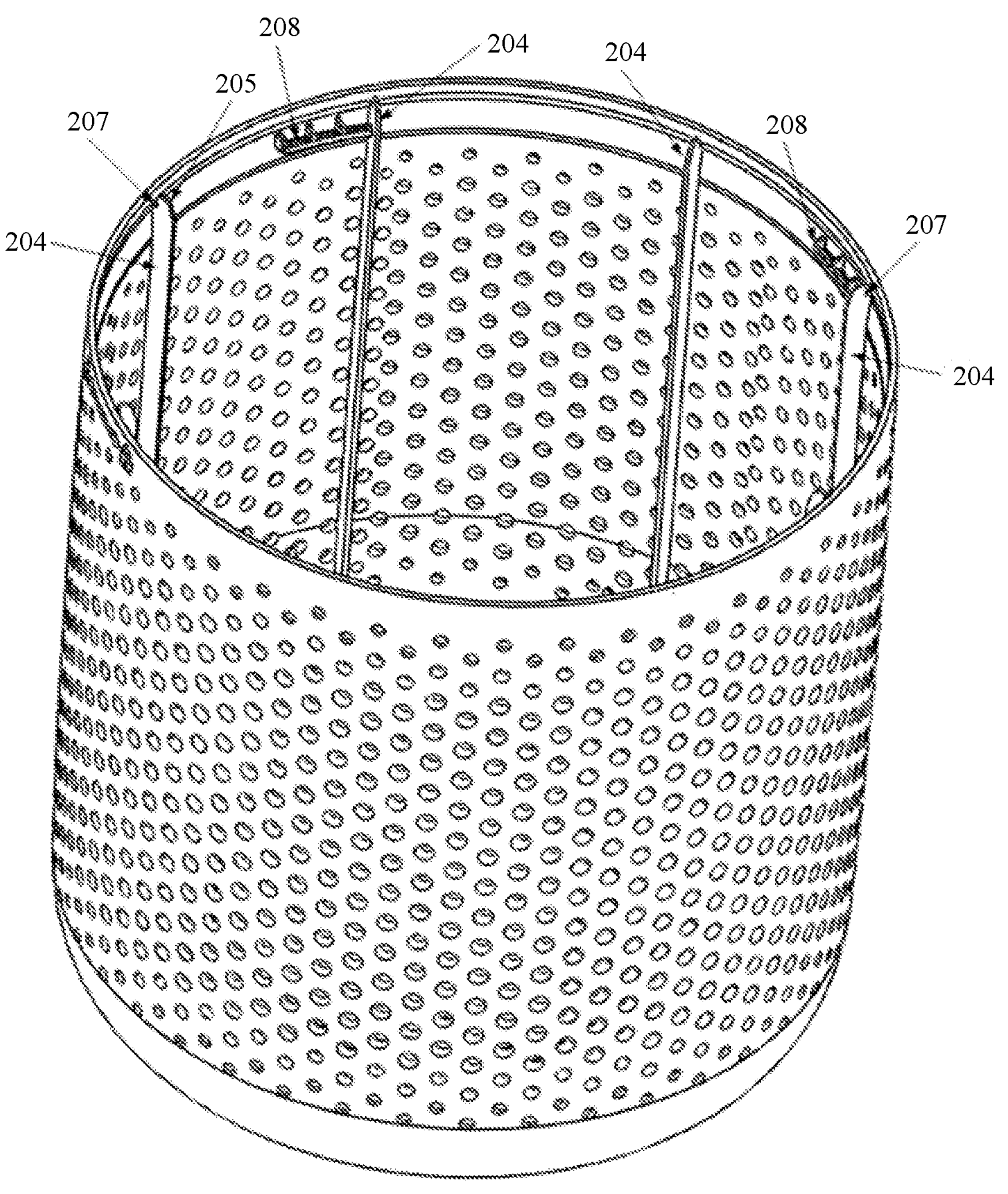
FIG. 3 is a schematic structural diagram of a second housing.
Figure 4:
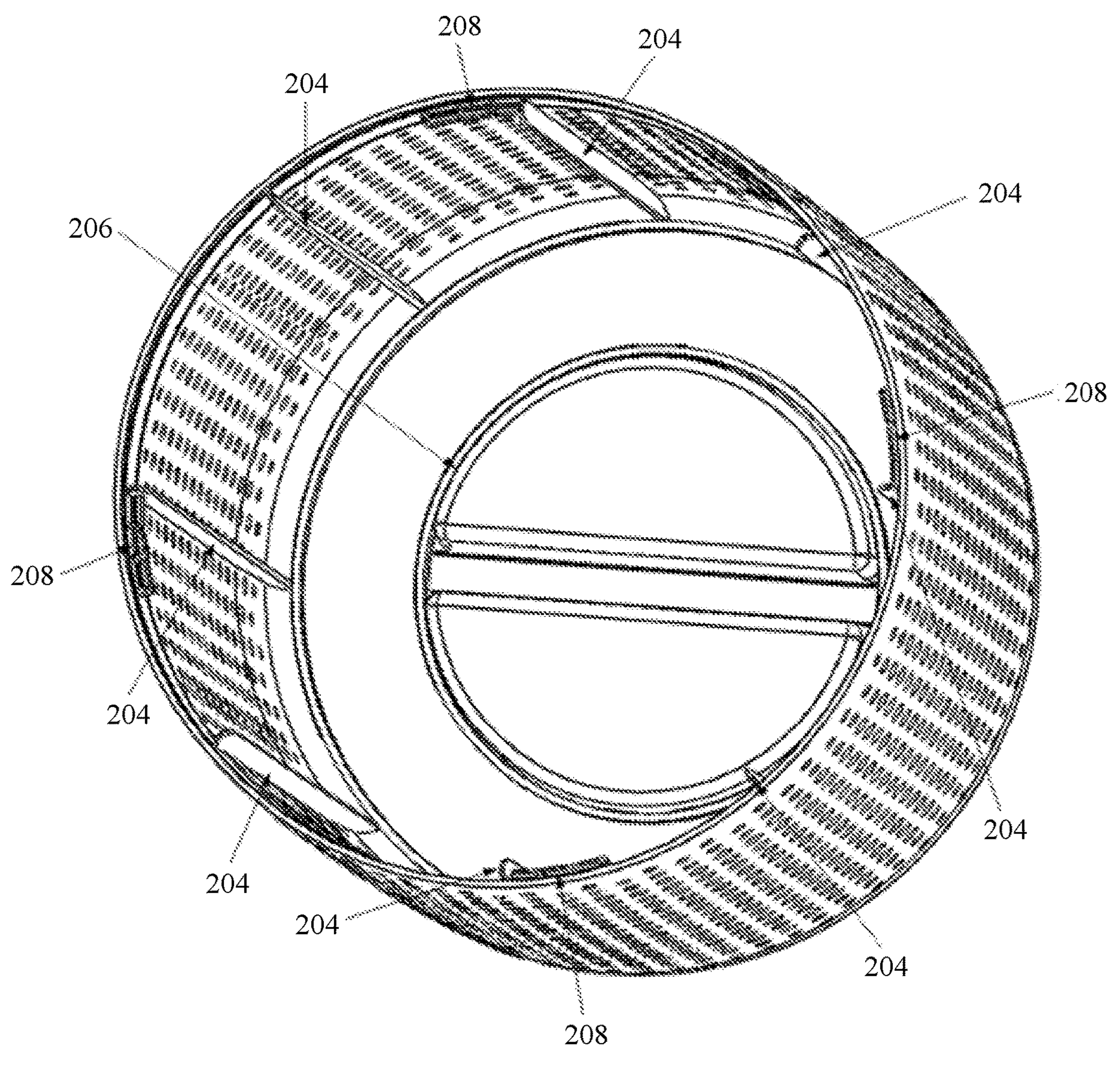
FIG. 4 is a schematic structural diagram of the second housing from another perspective.
Figure 9:
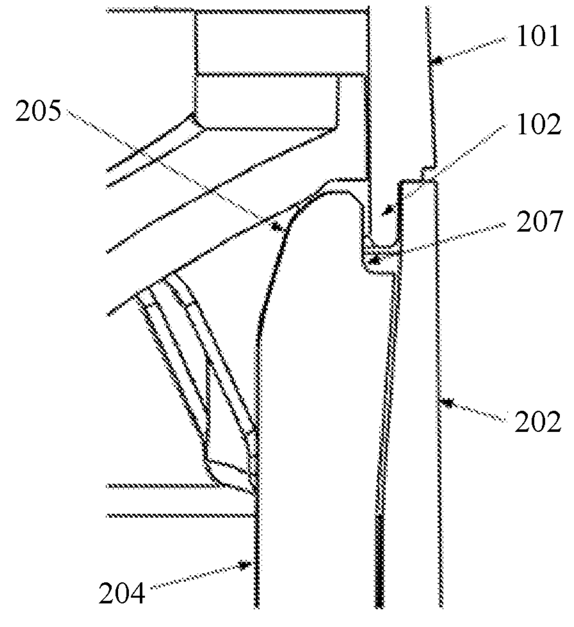
FIG. 9 is an enlarged view of a part A in FIG. 7.

In addition, as shown in FIG. 2, FIG. 3, and FIG. 9, in the process of installing the filter screen 201, to facilitate the abutting of the filter screen 201 against a plurality of convex ribs evenly distributed in the circumferential direction (or to facilitate the insertion of the filter screen 201 into a circular space surrounded by a plurality of convex ribs), preferably, an end portion of each convex rib close to the connection opening of the second housing 202 is an arc-shaped end portion 205, so that a horn-shaped lead-in structure can be formed through the matching of the plurality of convex ribs, and therefore the filter screen 201 can enter the circular space more easily, making it more convenient to install the filter screen 201.

Figure 5:
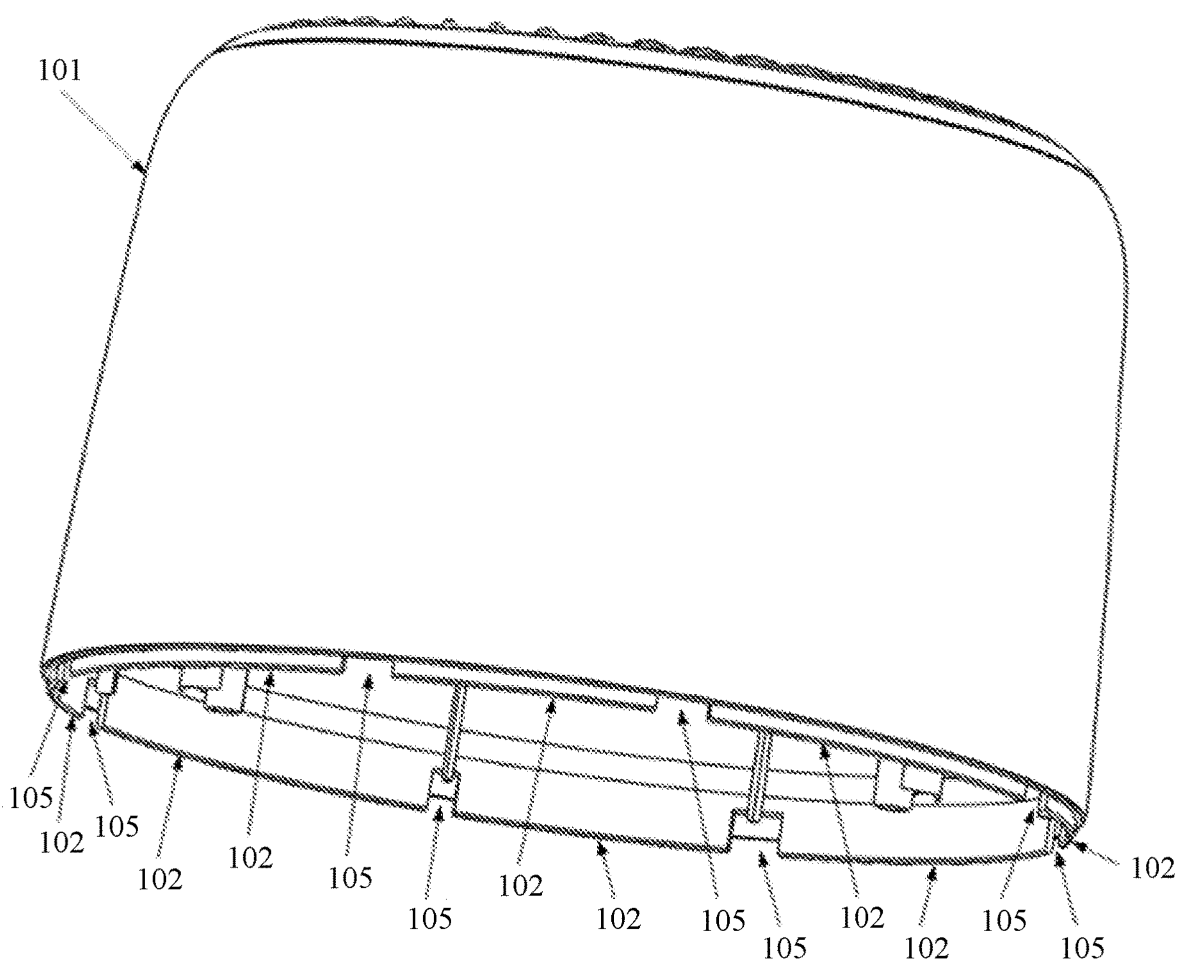
FIG. 5 is a schematic structural diagram of a first housing.

Specifically, on the basis that the electronic control assembly and the air drive assembly are arranged in the first housing 101 of the first body 1, the connection between the first body 1 and the second body 2 is achieved through the connection between the first housing 101 and the second housing 202. Therefore, to facilitate the connection between the two housings, as shown in FIG. 5, preferably, a protruding member 102 is arranged at the connection opening of the first housing 101, and the protruding member 102 protrudes relative to the connection opening in the axial direction of the barrel-shaped first housing 101. During specific assembly, the second body 2 is located at the bottom of the first body 1. Therefore, if the protruding members 102 are axially protruded relative to the downward connection opening of the first housing 101, the protruding members 102 can be protruded relative to the connection opening in a direction close to the second housing 202. When the first housing 101 and the second housing 202 are in butt joint, the protruding members 102 protruding toward the second housing 202 can axially overlap an edge of the connection opening of the second housing 202 (that is, the protruding members 102 extend into the connection opening of the second housing 202 or surround the outside of the connection opening of the second housing 202), thereby achieving the connection between the first housing 101 and the second housing 202 (this connection manner may be understood as insertion or sleeving). That is, the protruding members 102 are each a transitional connection structure of the first housing 101 and the second housing 202, and the first housing 101 and the second housing 202 that are aligned are pre-connected through the transitional connection of the protruding members 102, and then the first body 1 and the second body 2 are pre-connected. Multiple options are available for the specific structure of each protruding member 102. In the present application, to enhance connection stability of the first body 1 and the second body 2, preferably, the protruding members 102 are each convex ring connected to the connection opening of the first housing 101 and coaxial with the connection opening, and an outer diameter of the convex ring is smaller than an outer diameter of the connection opening, so that the first housing 101 and the second housing 202 can be omnidirectionally connected in the 360° circumferential direction. In the present application, to make the appearance of the air purifier more beautiful, preferably, the outer diameter of the first housing 101 and the outer diameter of the second housing 202 are the same, so that the connection between the first body 1 and the second body 2 is smoother when the air purifier has a non-cylindrical structure, or the assembled first body 1 and second body 2 constitute a more regular cylindrical structure when the air purifier has a cylindrical structure. When the outer diameter of the first housing 101 and the outer diameter of the second housing 202 are the same, if the outer diameter of the convex ring is smaller than that of the first housing 101, the outer diameter of the convex ring can also be smaller than that of the second housing 202. Due to the smaller outer diameter, when the first housing 101 is connected to the second housing 202, the convex ring can be inserted into the connection opening of the second housing 202 during the butt joint of the first housing 101 and the second housing 202, thereby achieving the insertion connection between the first housing 101 and the second housing 202, and enabling the first body 1 to be pre-connected to the second body 2 (the pre-connection is with regard to the fastened connection implemented by using the buckles 108 and the snap-fit members 208, and the connection firmness of the pre-connection is less than the connection firmness of the fastened connection). In addition, the protruding members 102 each may alternatively have other structures, such as a plurality of insertion strips protruding axially on the connection opening of the first housing 101 and evenly distributed in the circumferential direction.

On the basis that the first housing 101 and the second housing 202 are pre-connected by using the foregoing protruding members 102, to further improve stability and firmness of the pre-connection, as shown in FIG. 2, FIG. 3, and FIG. 9, preferably, clamping grooves 207 are arranged at a connection opening of the second housing 202, and the protruding members 102 enter the clamping grooves 207 and are clamped with the clamping grooves 207 to achieve butt joint of the first body 1 and the second body 2. Through the arrangement of the clamping grooves 207, the protruding members 102 can be inserted into the clamping grooves 207 to be clamped with the clamping grooves 207 when entering the connection opening of the second housing 202, so that the pre-connection between the first housing 101 and the second housing 202 can be achieved not only through the insertion of the protruding members 102 into the second housing 202, but also through the clamping of the protruding members 102 in the clamping grooves 207. This can further improve stability and firmness of the pre-connection between the first housing 101 and the second housing 202. To normally match the annular protrusions 102, the clamping grooves 207 may also be annular grooves arranged on the inner side of the second housing 202, or may alternatively be set as a plurality of intermittent grooves. In the present application, to simplify the structure, preferably, the clamping grooves 207 are a plurality of intermittent grooves, and the plurality of intermittent grooves are formed by intercepting a plurality of arc segments on a circle coaxial with the second housing 202. To make connection stress more uniform, the plurality of intermittent grooves are evenly distributed in the circumferential direction of the second housing 202. In addition, because the outer diameter of the convex ring is smaller than the outer diameter of the second housing 202, the radius of a circle at which the clamping grooves 207 are located needs to be smaller than the outer diameter of the second housing 202 to achieve the normal insertion of the convex ring into the second housing. Based on this, an arrangement member protruding in the axial direction of the second housing 202 needs to be arranged on the inner wall of the second housing 202, so as to form clamping grooves 207 in the arrangement member. The additional arrangement of the arrangement member increases structural complexity of the air purifier. Each of the foregoing outer guide members 204 (convex ribs) is a component which is arranged on the inner wall of the second housing 202 and protrudes in the axial direction of the second housing 202. The outer guide member has the same setting manner as the arrangement member that needs to be additionally arranged, and can also meet requirements that a plurality of clamping grooves 207 are located on the same circle and evenly distributed in the circumferential direction of the second housing 202. Therefore, to simplify the structure, in the present application, each clamping groove 207 is preferably provided in an outer guide member 204, and more specifically, the clamping groove 207 is provided in an arc-shaped end portion 205 (as shown in FIG. 9) of the outer guide member 204, and a special arrangement member specially used for forming the clamping groove 207 does not need to be arranged, thereby reducing structure arrangements.

Figure 6:
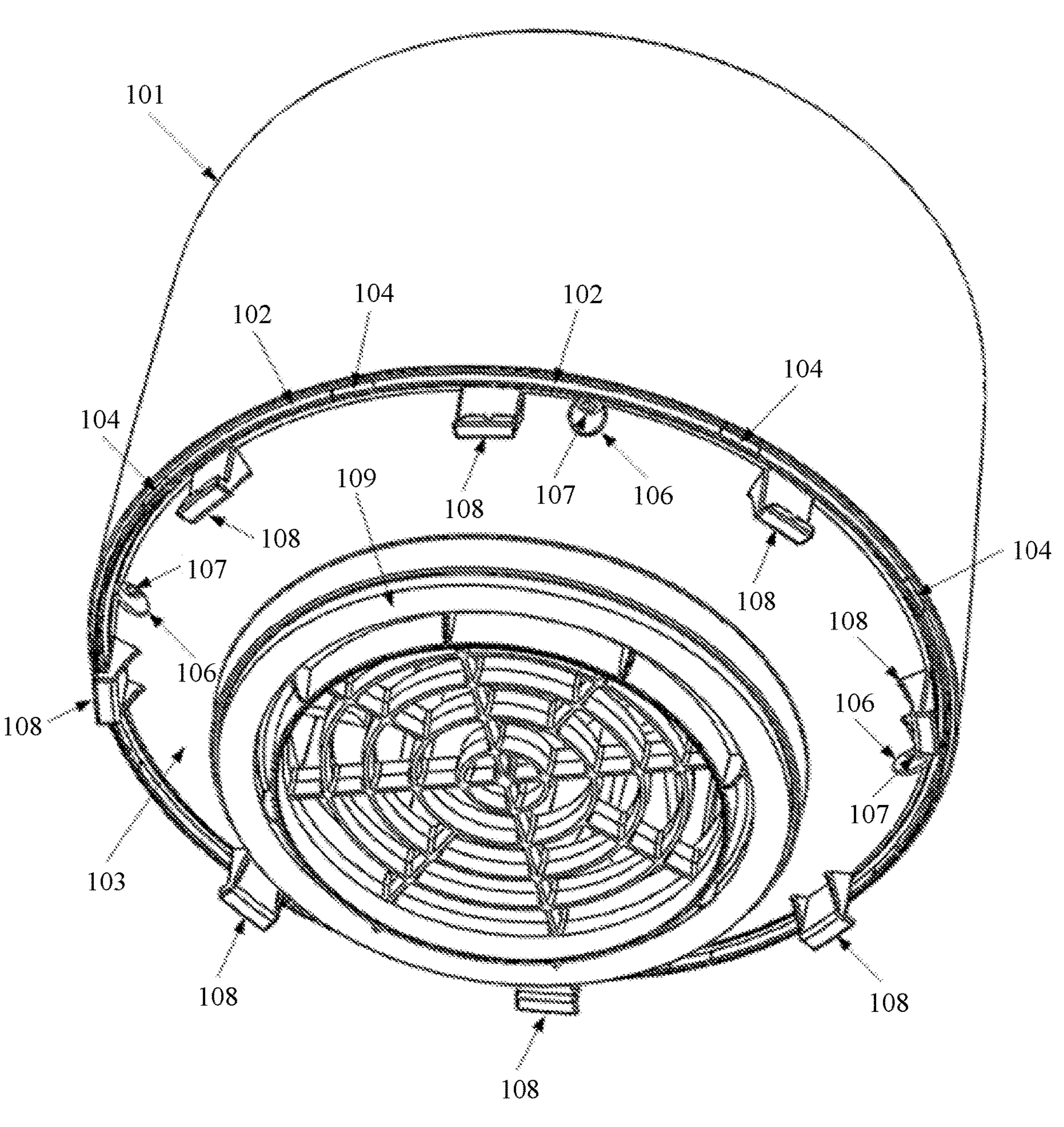
FIG. 6 is a schematic structural diagram of a connection between a flow guide member and the first housing.
Figure 7:
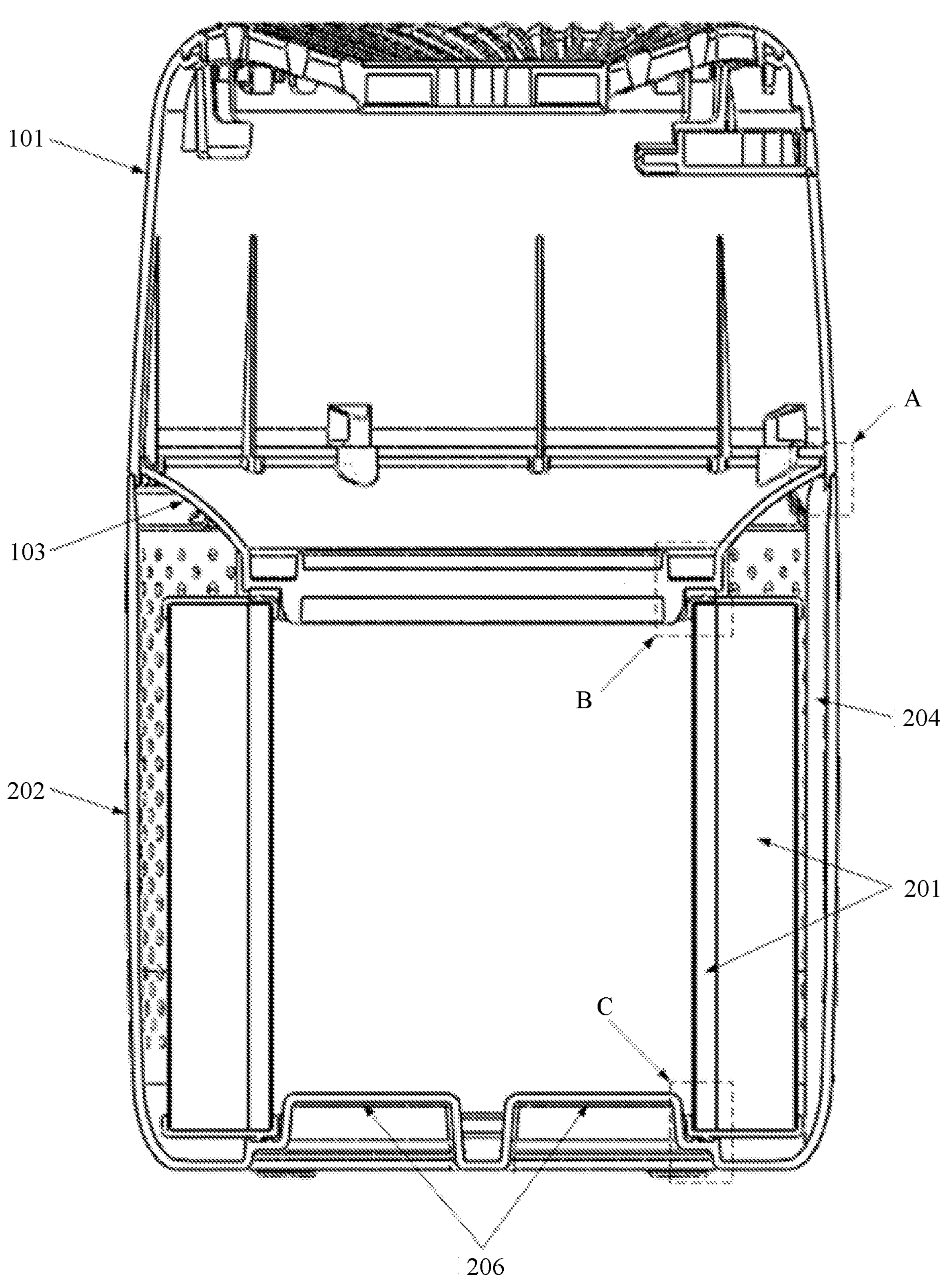
FIG. 7 is a sectional view of the air purifier (an electronic control assembly and an air drive assembly are not shown in the figure)
Figure 8:
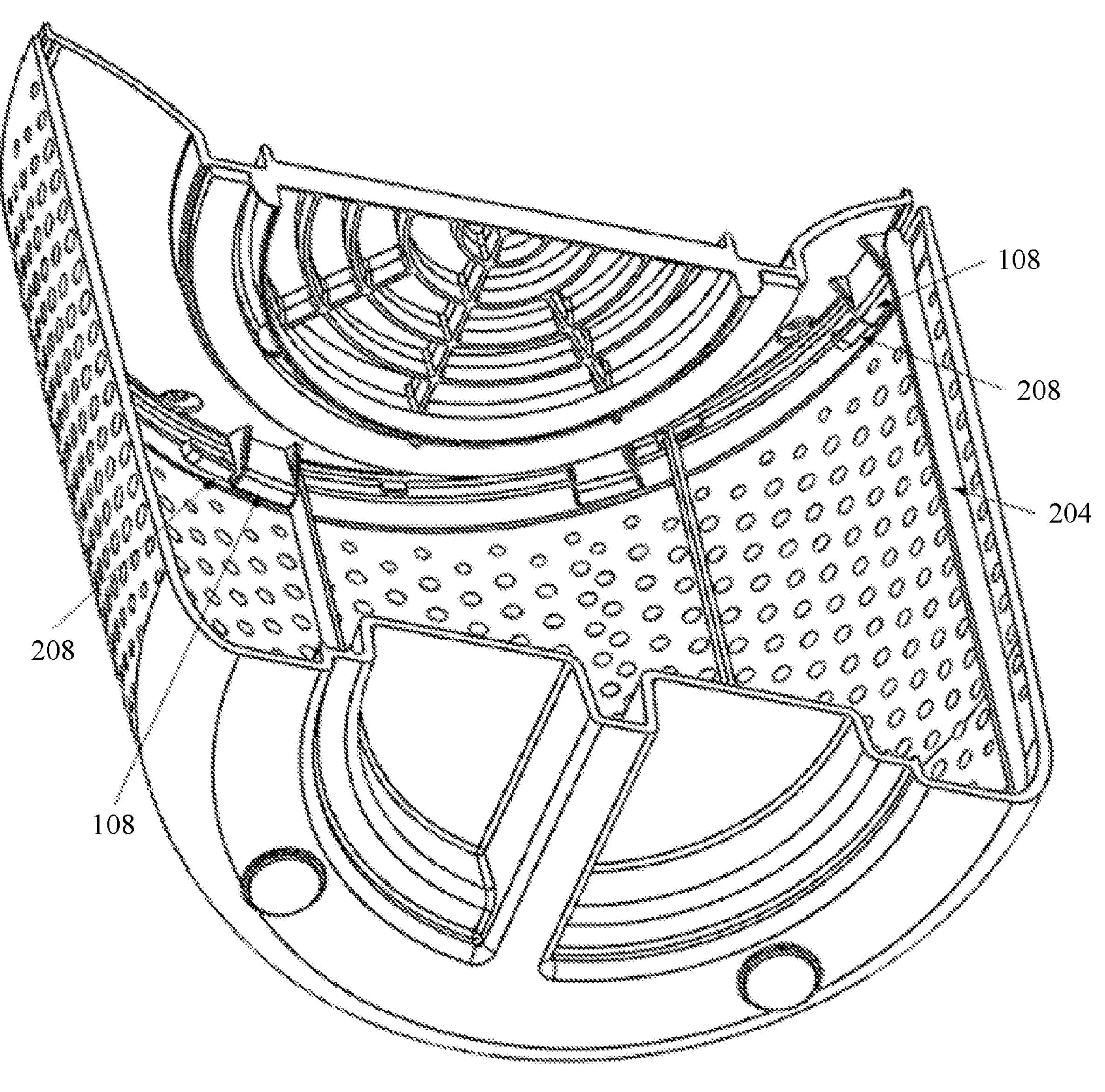
FIG. 8 is a schematic structural diagram of hooking between buckles and snap-fit members.

As shown in FIG. 1 and FIG. 6 to FIG. 8, a flow guide member 103 for guiding filtered air into the first housing 101 is arranged at the connection opening of the first housing 101 used for butt joint with the second housing 202. The flow guide member 103 specifically has a horn structure, and has a large opening and a small opening. During specific arrangement, the large opening faces an inner cavity of the first housing 101 (or in other words, faces the air drive assembly arranged in the first housing 101), and the small opening faces an inner cavity of the second housing 202 and communicates with the inner space of the filter screen 201. In addition, as shown in FIG. 6 and FIG. 8, in the present application, further preferably, the small opening is provided with a grid structure to increase structural strength of the flow guide member 103. Because the second body 2 is an air inlet filtering part of the air purifier, external air passes through the air inlet 203 provided in the second housing 202 under the suction action of a fan and enters the inner cavity of the second housing 202, penetrates the filter screen 201 in the inner cavity of the second housing 202 and enters the inner space of the filter screen 201, then sequentially passes through the small opening and the large opening and enters the inner cavity of the first housing 101, and is finally blown out to the outside of the air purifier from one end of the first housing 101 away from the second housing 202 (that is, the top end of the first housing 101) under the driving of the fan. The arrangement of the flow guide member 103 at the connection opening of the first housing 101 enables the air to flow inside the air purifier along a set path, that is, the flow guide member 103 separates the inner cavity of the first housing 101 from a part of the inner cavity of the second housing 202 located on the outer side of the filter screen 201, so that the air entering the second housing 202 can enter the inner cavity of the first housing 101 from the inner space of the filter screen 201 only after penetrating the filter screen 201, thereby achieving the filtering of the incoming air, and ensuring normal operation of the air purifier. In addition, other methods may alternatively be used to filter the air, for example, instead of arranging the flow guide member 103, the structure of the filter screen 201 is changed to block the connection opening of the first housing 101, so that the air entering the inner cavity of the first housing 101 has to penetrate through the filter screen 201 before entering the inner cavity of the first housing 101. This can also ensure the normal operation of the air purifier.

In the present application, preferably, the flow guide member 103 has a horn structure, and the large opening of the horn structure faces the inner cavity of the first housing 101. Therefore, on this basis, preferably, radially protruding clamping blocks 104 are arranged on an edge of the large opening of the horn structure, the protruding members 102 are each provided with a clamping opening 105, and the clamping blocks 104 are clamped with the clamping openings 105 to position the flow guide member 103 at the connection opening of the first housing 101. When the flow guide member 103 is installed on the first housing 101, the flow guide member 103 may be first positioned at the connection opening of the first housing 101, and then the flow guide member 103 is in fastened connection to the first housing 101. Multiple options may be available for the positioning structure of the flow guide member 103 on the first housing 101. In the present application, preferably, clamping blocks 104 protruding in the radial direction of the large opening are arranged on the edge of the large opening of the flow guide member 103, and the clamping blocks 104 are set as a plurality of clamping blocks evenly distributed in the circumferential direction of the large opening, so as to improve positioning stability and stress balance of the flow guide member 103 and the first housing 101. Accordingly, the convex ring is provided with a plurality of clamping openings 105 (each clamping opening 105 is formed by removing part of an arc-shaped segment of the convex ring). When the flow guide member 103 needs to be positioned on the first housing 101, the clamping blocks 104 on the flow guide member 103 are clamped into the clamping openings 105 on the convex ring in a one-to-one manner, and the positioning and pre-connection between the flow guide member 103 and the first housing 101 (specifically the convex ring on the first housing 101) are achieved through the clamping of the clamping blocks 104 in the clamping openings 105. More preferably, to avoid affecting the transitional connection between the convex ring and the second housing 202 due to the connection of the flow guide member 103 to the convex ring, preferably, structures of the clamping block 104 and the clamping opening 105 match, that is, after the clamping block 104 is clamped into the clamping opening 105, the clamping block 104 fills the clamping opening 105, and the clamping block 104 does not protrude relative to the clamping opening 105, so that the convex ring can become a complete and regular annular structure. Furthermore, it is ensured that the convex ring is well inserted in the second housing 202 and well clamped with the clamping groove 207, which improves the reliability of the connection between the first body 1 and the second body 2, and also enables the first housing 101 to have better appearance integrity. In addition, the positioning of the flow guide member 103 on the first housing 101 may alternatively be implemented by using other methods, for example, instead of arranging the clamping block 104 and clamping opening 105, the outer diameter of the large opening of the flow guide member 103 is made to be the same as or slightly greater than the inner diameter of the first housing 101 when the flow guide member 103 is molded. In this way, transition fit or interference fit between the flow guide member 103 and the first housing 101 can be implemented, and therefore the flow guide member 103 is directly clamped at the connection opening of the first housing 101.

Further, the flow guide member 103 is fixedly connected to the first housing 101 by using a connecting member 107. The connecting member 107 is preferably a screw. As shown in FIG. 6, specifically, a through hole 106 is formed in a part of the flow guide member 103 close to the large opening, and a threaded hole is formed in the inner wall of the first housing 101 close to the connection opening, so that the screw passes through the through hole 106 and the threaded hole in sequence and is in threaded connection with the threaded hole, thereby implementing the fastening installation of the flow guide member 103 at the connection opening of the first housing 101. Certainly, on the premise that the clamping firmness between the clamping block 104 and the clamping opening 105 is sufficient, the connecting member 107 may not be used any more.

From the above, it may be learned that the first housing 101 and the second housing 202 are pre-connected by using the protruding members 102 and the clamping grooves 207. This connection method mainly achieves the function of alignment, and does not achieve sufficient connection strength. Therefore, in the present application, to achieve sufficient connection strength between the first housing 101 and the second housing 202, and achieve the fastened connection between the first body 1 and the second body 2, the foregoing buckles 108 and snap-fit members 208 are arranged on the first housing 101 and the second housing 202. As shown in FIG. 1 to FIG. 4, FIG. 8, and FIG. 13, in specific arrangement, buckles 108 are convexly arranged on the surface of the flow guide member 103 that faces away from the first housing 101, and snap-fit members 208 are arranged close to the connection opening of the second housing 202 when convexly arranged on the inner wall of the second housing 202. In this way, by enabling the first body 1 in butt joint to rotate relative to the second body 2, the buckles 108 can be aligned and hooked with the snap-fit members 208 to achieve the connection between the first body 1 and the second body 2, and the buckles 108 and the snap-fit members 208 can be staggered and separated to achieve the separation of the first body 1 from the second body 2. The snap-fit members 208 are arranged on the inner wall of the second housing 202 and protrude toward an axis of the second housing 202. Multiple options are available for the specific structure of the buckles 108. In the present application, each buckle 108 preferably has an L-shaped or hook-shaped structure as shown in FIG. 1, FIG. 6, and FIG. 8. In the process of achieving the fastened connection between the first housing 101 and the second housing 202, the first housing 101 and the second housing 202 need to be in butt joint first (this butt joint process is the foregoing pre-connection process), and then the foregoing operation of hooking the buckles 108 and the snap-fit members 208 is performed.

In addition, each buckle 108 may alternatively have other structures, for example, the buckle 108 is also a protruding block body. The block bodies enter the inner cavity of the second housing 202 through the butt joint of the first housing 101 and the second housing 202, and move to the bottom of the snap-fit members 208 through the rotation of the first housing 101 relative to the second housing 202, so that the connection between the first housing 101 and the second housing 202 can be achieved through the blocking against the block bodies by the snap-fit members 208.

When a plurality of circumferentially-distributed buckles 108 and a plurality of circumferentially-distributed snap-fit members 208 are provided, further preferably, the snap-fit members 208 and the outer guide members 204 are staggered. The reason why the snap-fit members 208 and the outer guide members 204 are staggered in the circumferential direction of the second housing 202 is to prevent the outer guide members 204 from interfering with the rotation of the buckles 108, that is, when the snap-fit members 208 and the outer guide members 204 overlap in the circumferential direction of the second housing 202, the outer guide members 204 will prevent the rotation of the buckles 108, so that the buckles 108 cannot be completely hooked with the snap-fit members 208, thereby affecting the fastening effect. When the snap-fit members 208 and the outer guide members 204 are staggered, that is, each snap-fit member 208 is arranged between two adjacent outer guide members 204, the buckles 108 can rotate between the two adjacent outer guide members 204 in the circumferential direction of the second housing 202, that is, an enough rotation space is provided to enable the buckle 108 to be staggered or aligned with the snap-fit members 208, and the two outer guide members 204 on two sides of the buckle 108 are located outside a rotation stroke of the buckle 108, thereby avoiding interference. Specifically, multiple options, such as a convex block, are also available for the structure of the snap-fit member 208. In the present application, to improve the snap-fit effect, preferably, each snap-fit member 208 is a plate-shaped member that protrudes vertically relative to the inner wall of the second housing 202 and extends in a strip shape in the circumferential direction of the second housing 202, so that a hooking area between the snap-fit member 208 and the buckle 108 can be increased. To improve the connection firmness between the plate-shaped member and the inner wall of the second housing 202, a plurality of reinforcing ribs that connect the plate-shaped member to the second housing are further arranged between the plate-shaped member and the inner wall of the second housing 202, so that a better fastening effect between the first housing 101 and the second housing 202 can be achieved.

In the foregoing structure, to increase the connection strength between components and facilitate the processing of the components, in the present application, preferably, the second housing 202 and the outer guide member 204 are of an integrated structure, the second housing 202 and the inner guide member 206 are of an integrated structure, the first housing 101 and the protruding member 102 are of an integrated structure, the flow guide member 103 and the clamping block 104 are of an integrated structure, the flow guide member 103 and the buckle 108 are of an integrated structure, and the second housing 202 and the snap-fit member 208 are of an integrated structure.

Figure 10:
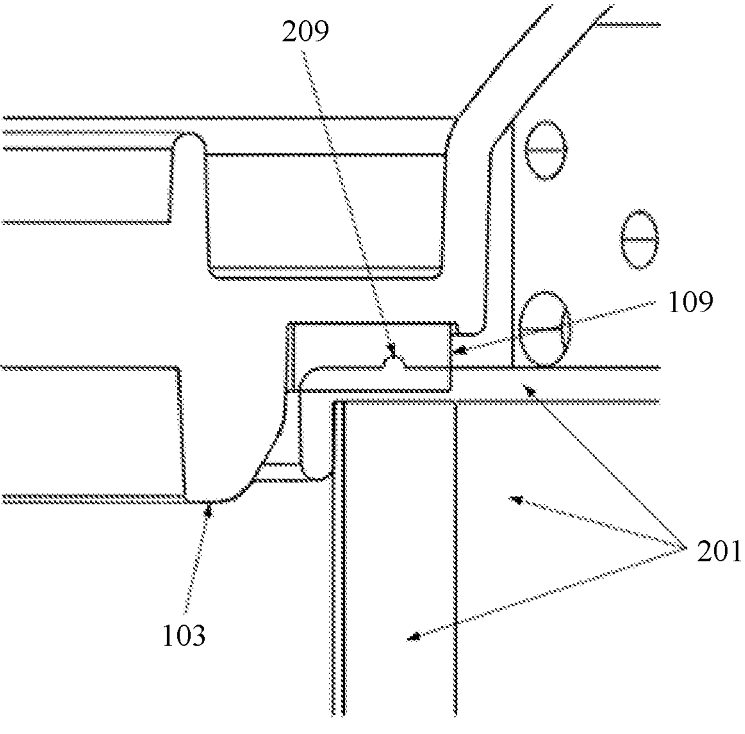
FIG. 10 is an enlarged view of a part B in FIG. 7.

As shown in FIG. 6, FIG. 7, and FIG. 10, in the present application, preferably, the surface of the flow guide member 103 that faces away from the first housing 101 is provided with a setting region corresponding to the filter screen 201, a first sealing member 109 is arranged in the setting region, and the first sealing member 109 abuts against a top end face of the filter screen 201 to achieve hermetic connection between the flow guide member 103 and the filter screen 201. Preferably, the setting region is aligned with the installation position of the filter screen 201, and the first sealing member 109 is arranged in the setting region through bonding, that is, the setting region is a bonding region of the filter screen 201. The first sealing member 109 is preferably sealing cotton with a prominent sealing effect and a relatively large sealing area. After the first housing 101 and the second housing 202 are in butt joint, the sealing cotton connected to the flow guide member 103 abuts against the top end face of the filter screen 201 located below the sealing cotton, so as to achieve the hermetic connection between the flow guide member 103 and the filter screen 201 and improve the isolation effect of the flow guide member 103. In this way, the air entering the second housing 202 can only pass through the filter screen 201 and enter the inner cavity of the first housing 101 through the inner space of the filter screen 201 and the small opening and the large opening of the flow guide member 103. In addition, through the arrangement of the sealing cotton in this way, the space outside the filter screen 201 and the inner cavity of the first housing 101 can be further effectively isolated when the height dimension of the filter screen 201 fluctuates, so that the purification effect of the air purifier will not be affected, and the operating performance of the air purifier is improved.

Further, as shown in FIG. 10, a protrusion 209 is arranged on the top end face of the filter screen 201, and when the first sealing member 109 abuts against the top end face, the protrusion 209 presses the first sealing member 109 to produce elastic deformation. The protrusion 209 for pressing the first sealing member 109 is arranged on the top end face of the filter screen 201. This can increase the contact area between the filter screen 201 and the sealing cotton, strengthen the tightness of contact with the sealing cotton, further improve the effect of hermetic connection between the filter screen 201 and the air guide member 103, and ensure that the air purifier has good purification quality. Preferably, the protrusion 209 is an annular protrusion coaxially arranged with the filter screen 201, so that the sealing effect can be comprehensively improved in the circumferential direction of the filter screen 201 or the small opening, and the air in the second housing 202 can be better prevented from directly entering the small opening without passing through the filter screen 201. Alternatively, the protrusions 209 may be a plurality of arc-shaped strip-shaped protrusions distributed on the same circle at intervals.

Figure 11:
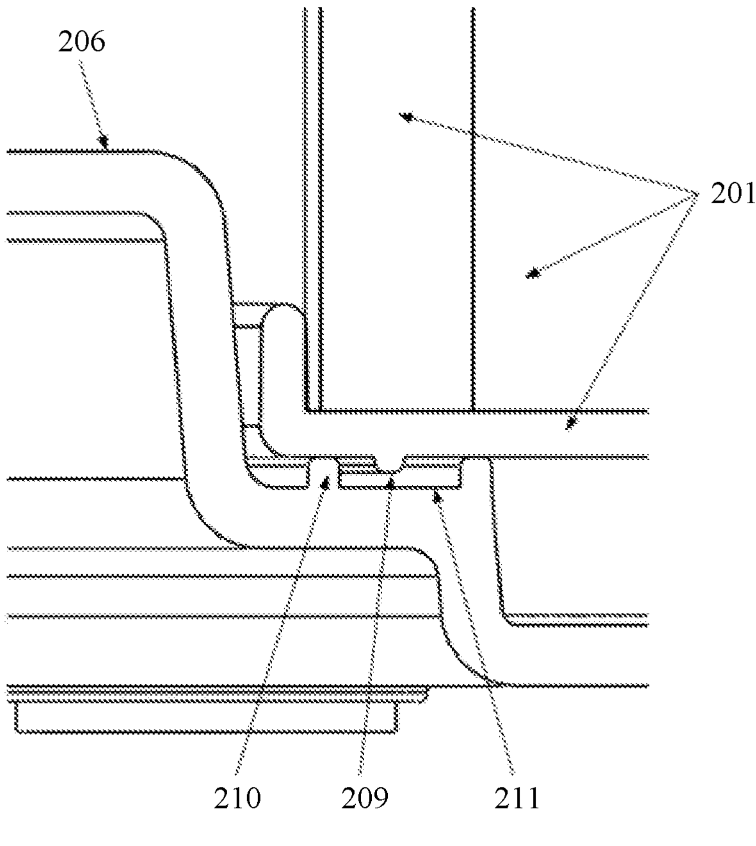
FIG. 11 is an enlarged view of a part C in FIG. 7.

More preferably, as shown in FIG. 11, a second sealing element 210 is arranged between a bottom end face of the filter screen 201 and the bottom wall of the second housing 202, so that the filter screen 201 is hermetically connected to the bottom wall of the second housing 202. Through the arrangement of the second sealing element 210, the sealing between the filter screen 201 and the bottom wall can be achieved, so that air is prevented from entering the inner space of the filter screen 201 from a gap between the filter screen 201 and the bottom wall, and a situation that the air is not filtered is more thoroughly prevented. Therefore, the air entering the first housing 101 is all air filtered by the filter screen 201, and the air purifier has a better purification effect. The second sealing member 210 is preferably a rubber sealing ring and has more excellent deformability, so that good sealing between the filter screen 201 and the bottom wall can be achieved. Further, as shown in FIG. 11, preferably, the bottom end face of the filter screen 201 is also provided with a protrusion 209, and the sealing effect can also be improved by matching the protrusion 209 with the second sealing member 210 in a staggered manner.

In the present application, the sealing elements are arranged at the upper end and the lower end of the filter screen 201, and the forms of the sealing elements are diversified, so that good and more targeted sealing can be achieved according to different sealing environments, thereby improving the sealing effect on the filter screen 201. In addition, compared with the method of sealing the upper end and the lower end of the filter screen 201 by using the sealing cotton, the combined use of the sealing cotton and sealing rings can further improve production efficiency and reduce a production cost of the air purifier.

Figure 13:
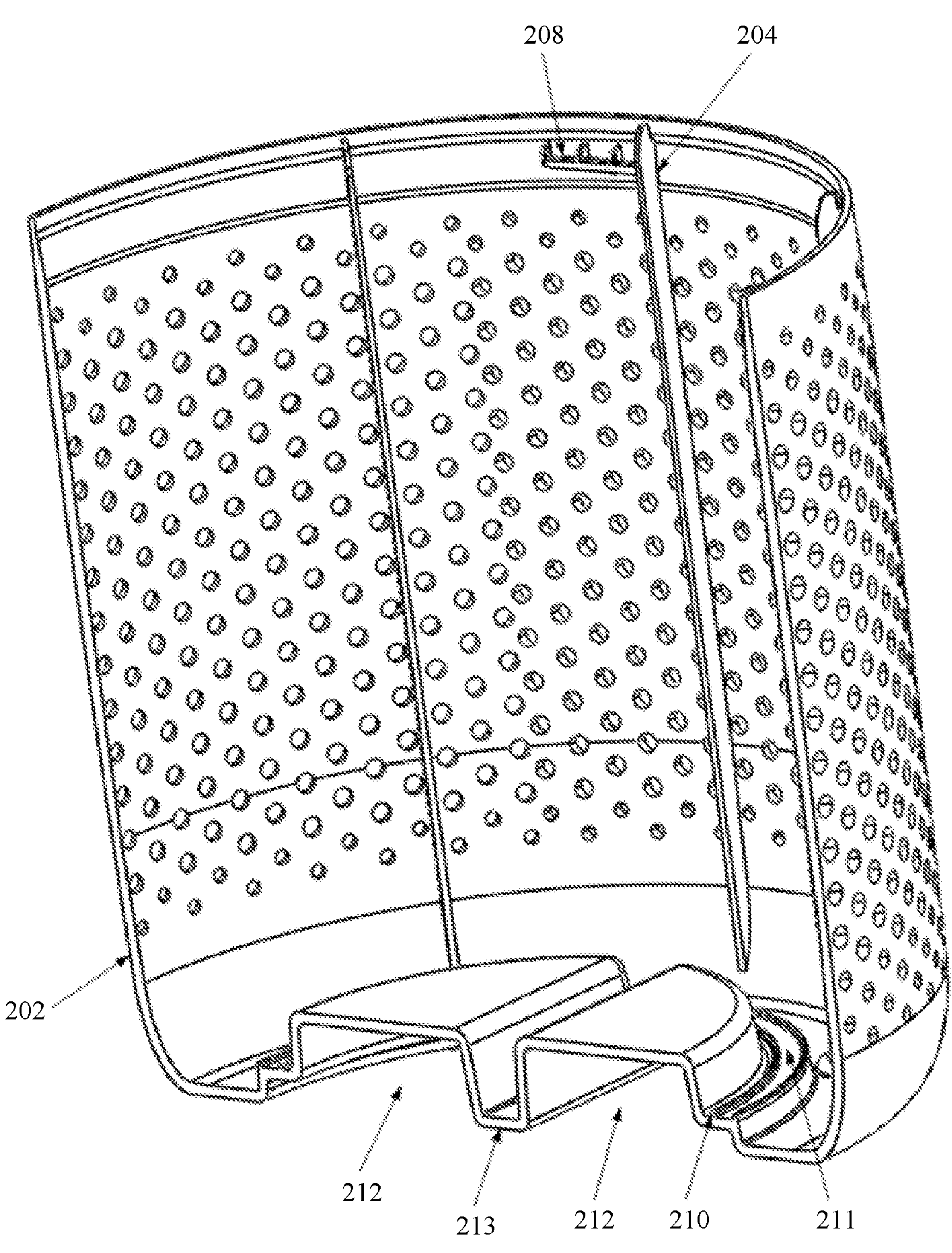
FIG. 13 is a schematic structural diagram of the cut second housing.

As shown in FIG. 11 and FIG. 13, in the present application, further preferably, the bottom wall of the second housing 202 is provided with an annular mounting groove 211 for mounting the second sealing member 210, and the mounting groove 211 is arranged around the inner guide member 206 and coaxial with the inner guide member 206. Arranging the mounting groove 211 in the bottom wall not only facilitates the mounting of the second sealing member 210, but also enables the second sealing member 210 to be more stably arranged on the bottom wall, and enables the second sealing member 210 to be attached to the bottom end face of the filter screen 201 more accurately, thereby further enhancing the sealing effect between the bottom of the filter screen 201 and the bottom wall. Preferably, the mounting groove 211 and the bottom wall of the second housing 202 are of an integrated structure.

Figure 12:
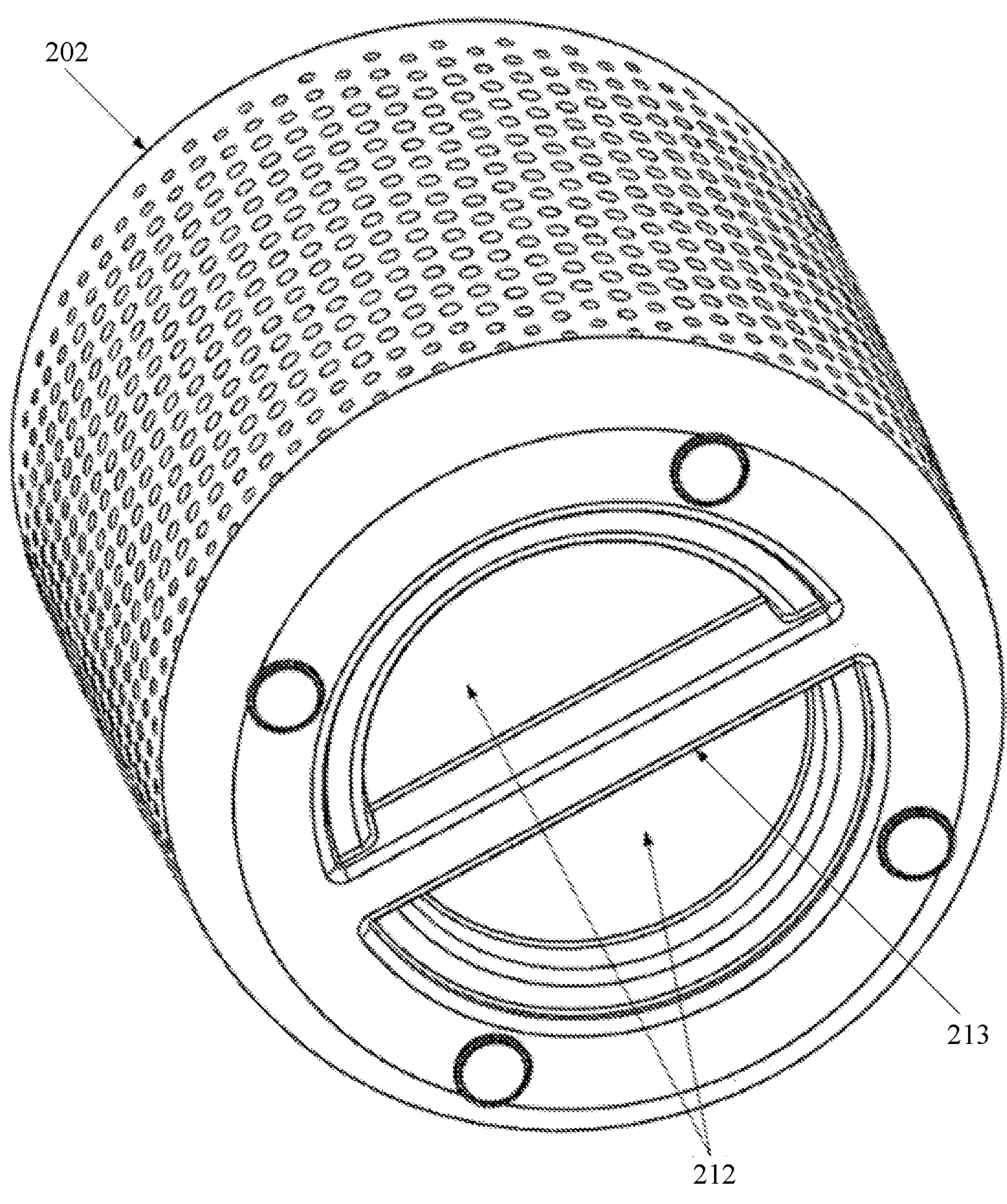
FIG. 12 is a schematic structural diagram of a groove and a handle arranged on the second housing.

In the present application, as shown in FIG. 12 and FIG. 13, the outer surface of the bottom wall of the second housing 202 is provided with a groove 212, and a handle 213 for bearing a rotating force to drive the second housing 202 to rotate relative to the first housing 101 to enable the second body 2 to be separated from or connected to the first body 1 is arranged in the groove 212. The arrangement of the handle 213 can make it convenient to rotate the second housing 202. Arranging the handle 213 on the outer surface of the bottom wall of the second housing 202 (that is, at the bottom of the entire air purifier) can hide the handle 213, and prevent the handle 213 from affecting the attractive appearance of the air purifier due to its arrangement on the circumferential outer wall of the air purifier. The outer surface of the bottom wall is provided with the groove 212, so that the handle 213 can be accommodated, and the arrangement of the handle 213 is prevented from affecting placement stability of the air purifier. When the filter screen 201 is disassembled by operating the handle 213, because the air purifier provided in the present application is a small desktop air purifier, the user can directly pick up the air purifier (but does not need to invert the air purifier) to screw the handle 213 located at the bottom of the air purifier, so that the second body 2 can rotate relative to the first body 1, and the buckles 108 and the snap-fit members 208 in an aligned and hooked state are staggered, thereby removing fastened connection between the first housing 101 and the second housing 202. Then a separating force may be applied to the first housing 101 and/or the second housing 202 to move the protruding members 102 out of the clamping groove 207 and the inner cavity of the second housing 202, so that the first body 1 is separated from the second body 2, and then assembly and disassembly and cleaning operation can be performed on the filter screen 201 and the second housing 202 independently. When the air purifier needs to be assembled, the assembly can be implemented by performing reverse operations of the foregoing operations.

In addition, to optimize the structure, in the present application, preferably, the bottom wall of the second housing 202 is recessed toward the inside of the second housing 202 to form the groove 212 and the inner guide member 206. This can reduce the thickness of the bottom wall, save materials, and reduce a cost.

In this description, the structure of each part is described in a progressive manner, and the description of the structure of each part focuses on differences from an existing structure. The whole and partial structure of the air purifier can be obtained by combining the structures of the foregoing parts.

The foregoing description of the disclosed embodiments enables a person skilled in the art to achieve or use the present invention. Multiple modifications to these embodiments are obvious to a person skilled in the art, and general principles defined herein may be implemented in other embodiments without departing from the spirit or scope of the present invention. Therefore, the present invention will not be limited to the embodiments shown herein, but should accord with the widest scope consistent with the principles and novel features disclosed herein.

What is claimed is:

1. An air purifier, comprising:

a first body comprising a first housing and a flow guide member; and a second body, configured to take in air and filter the incoming air and comprising a second housing, wherein the second body is detachably connected to the first body;

a plurality of buckles arranged on the flow guide member, and a plurality of snap-fit members concavely arranged on an inner wall of the second housing;

the plurality of buckles and the plurality of snap-fit members being circumferentially-distributed; and a plurality of filter guides positioned around an interior surface of the second body, wherein each of the plurality of filter guides vertically spans a filter screen of the second body;

wherein the number of the buckles is greater than the number of the snap-fit members, such that each of the snap-fit members is capable of being connected to one buckle, and all the snap-fit members are configured to connect to each of the buckles; and wherein the first body is enabled to rotate relative to the second body, so that the buckles are capable of being hooked with the snap-fit members to connect the first body to the second body in a butt joint, and the buckles are capable of being separated from the snap-fit members to separate the first body from the second body.

2. The air purifier according to claim 1, further comprising an inner guide member arranged on an inner side of the second body, the inner guide member comprising a convex block.

3. The air purifier according to claim 2, wherein the second housing is a barrel-shaped housing, the plurality of filter guides is a plurality of strip-shaped members which are convexly concavely arranged on a circumferential inner wall of the second housing and extend in an axial direction of the second housing, and all the strip-shaped members are distributed at intervals in a circumferential direction of the second housing and are in contact with an outer wall of the filter screen; and the inner guide member is a convex block convexly arranged on a bottom wall of the second housing, and the convex block is in contact with an inner wall of a filter.

4. The air purifier according to claim 3, wherein the first housing is barrel-shaped, and wherein protruding members are arranged at a connection opening of the first housing, and the protruding members protrude relative to the connection opening in an axial direction of the first housing.

5. The air purifier according to claim 4, wherein clamping grooves are arranged at a connection opening of the second housing, and the protruding members enter the clamping grooves and are clamped with the clamping grooves to achieve the butt joint of the first body and the second body.

6. The air purifier according to claim 4, wherein the flow guide member is arranged at the connection opening of the first housing and is used for the butt joint with the second housing.

7. The air purifier according to claim 6, wherein the protruding members collectively form a ring around the connection opening of the first housing and coaxial with the connection opening, and an outer diameter of the ring is smaller than an outer diameter of the connection opening; the flow guide member has a horn structure, and radially protruding clamping blocks are arranged on an edge of a large opening of the horn structure, the protruding members are each provided with a clamping opening, and the clamping blocks are clamped with the clamping openings to position the flow guide member at the connection opening of the first housing.

8. The air purifier according to claim 6, wherein the buckles are convexly arranged on a surface of the flow guide member and face away from the first body; and wherein the snap-fit members and the plurality of filter guides are in a staggered arrangement.

9. The air purifier according to claim 6, wherein a surface of the flow guide member faces away from the first housing and is provided with a setting region corresponding to the filter, a first sealing member is arranged in the setting region, and the first sealing member abuts against a top end face of the filter to achieve hermetic connection between the flow guide member and the filter.

10. The air purifier according to claim 9, wherein a protrusion is arranged on the top end face of the filter, and when the first sealing member abuts against the top end face, the protrusion presses the first sealing member to produce elastic deformation.

11. The air purifier according to claim 2, wherein a second sealing element is arranged between a bottom end face of the filter and a bottom wall of the second housing, so that the filter is hermetically connected to the bottom wall of the second housing.

12. The air purifier according to claim 11, wherein the bottom wall of the second housing is provided with an annular mounting groove for mounting the second sealing member element, and the mounting groove is arranged around the inner guide member and coaxial with the inner guide member.

13. An air purifier apparatus comprising:

a first body comprising a first housing with a first opening defining a lower circumference;

a flow guide member incorporated into the first opening, and at least one protruding member extending from the lower circumference away from the housing;

the flow guide member comprising a plurality of buckles configured to extend past the at least one protruding member;

a second body comprising a second housing with a second opening defining an upper circumference;

a plurality of snap-fit members at the second opening facing inward of the upper circumference;

a plurality of filter guides positioned around an interior surface of the second body, wherein each of the plurality of filter guides vertically spans a filter screen of the second body;

wherein the at least one protruding member is configured to extend through the second opening into the second housing;

wherein the number of buckles is greater than the number of the snap-fit members and each of the plurality of snap-fit members is capable of engaging any of the plurality of buckles.

* * * * *